May 17, 1927. 1,628,817

G. F. WILSON ET AL

TIRE TRIMMING MACHINE

Filed Feb. 14, 1925 3 Sheets-Sheet 1

Inventors
George F. Wilson
Charles U. Lequillon
By Robert M. Pierson
Atty-

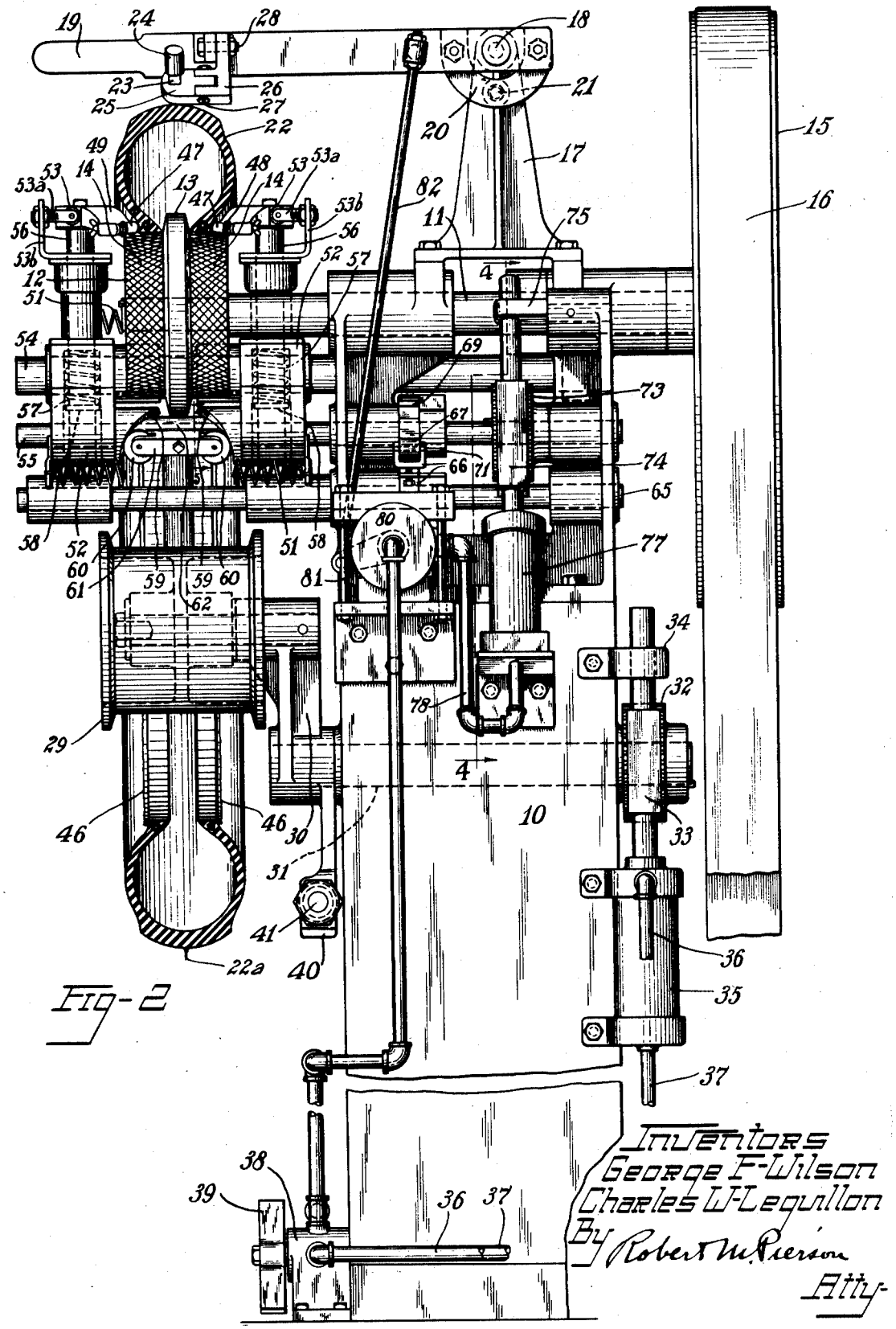

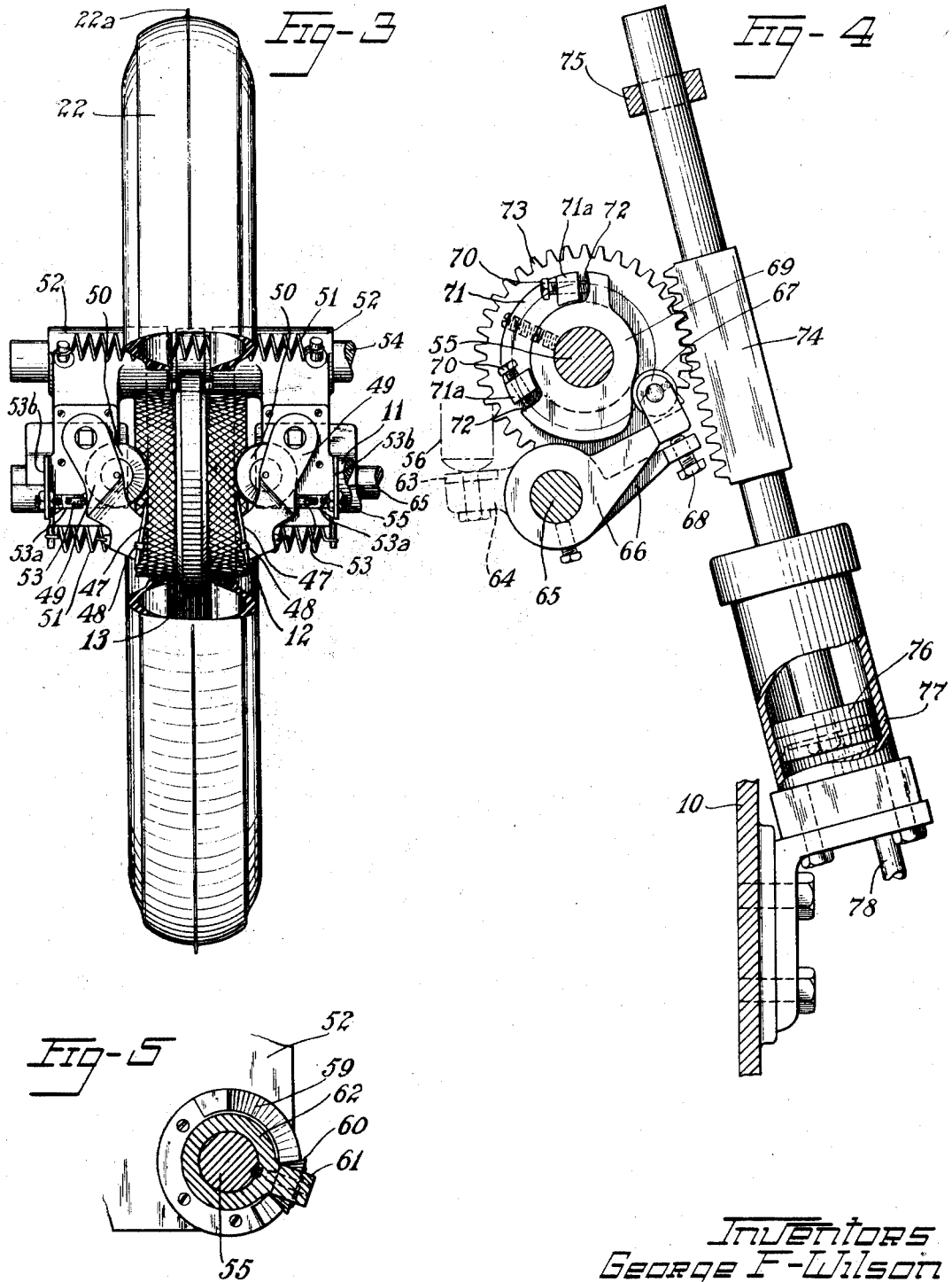

Patented May 17, 1927.

1,628,817

UNITED STATES PATENT OFFICE.

GEORGE F. WILSON AND CHARLES W. LEGUILLON, OF AKRON, OHIO, ASSIGNORS TO THE B. F. GOODRICH COMPANY, OF NEW YORK, N. Y., A CORPORATION OF NEW YORK.

TIRE-TRIMMING MACHINE.

Application filed February 14, 1925. Serial No. 9,139.

This invention relates to machines for trimming the mold fins or overflow rands from automobile tires, the specific embodiment herein described being adapted to operate upon pneumatic tires of the straight-side type.

Our chief object is to provide an improved machine adapted for rapid and accurate operation in the trimming of tires, and more especially tires having mold fins projecting from the outer side face of the tire adjacent the bead. A further object is to provide a machine of this character having a bead-trimming device adapted automatically to take a determinate position radially of the tire in accordance with the thickness of the bead from toe to heel, so that the said device, without a re-setting of adjustable parts, will trim the fins from successive tires of different sizes having their fins located at different distances from the heel of the bead in proportion to the size of tire and thickness of bead.

Of the accompany drawings:

Fig. 2 is a side elevation of the same, parts being broken away and the work being shown in section.

Fig. 3 is a plan view of the devices for trimming the bead fins and of the work, a part of the latter being sectioned and broken away.

Fig. 4 is a section on line 4—4 of Fig. 2.

Fig. 5 is a section on line 5—5 of Fig. 2.

Figure 1:
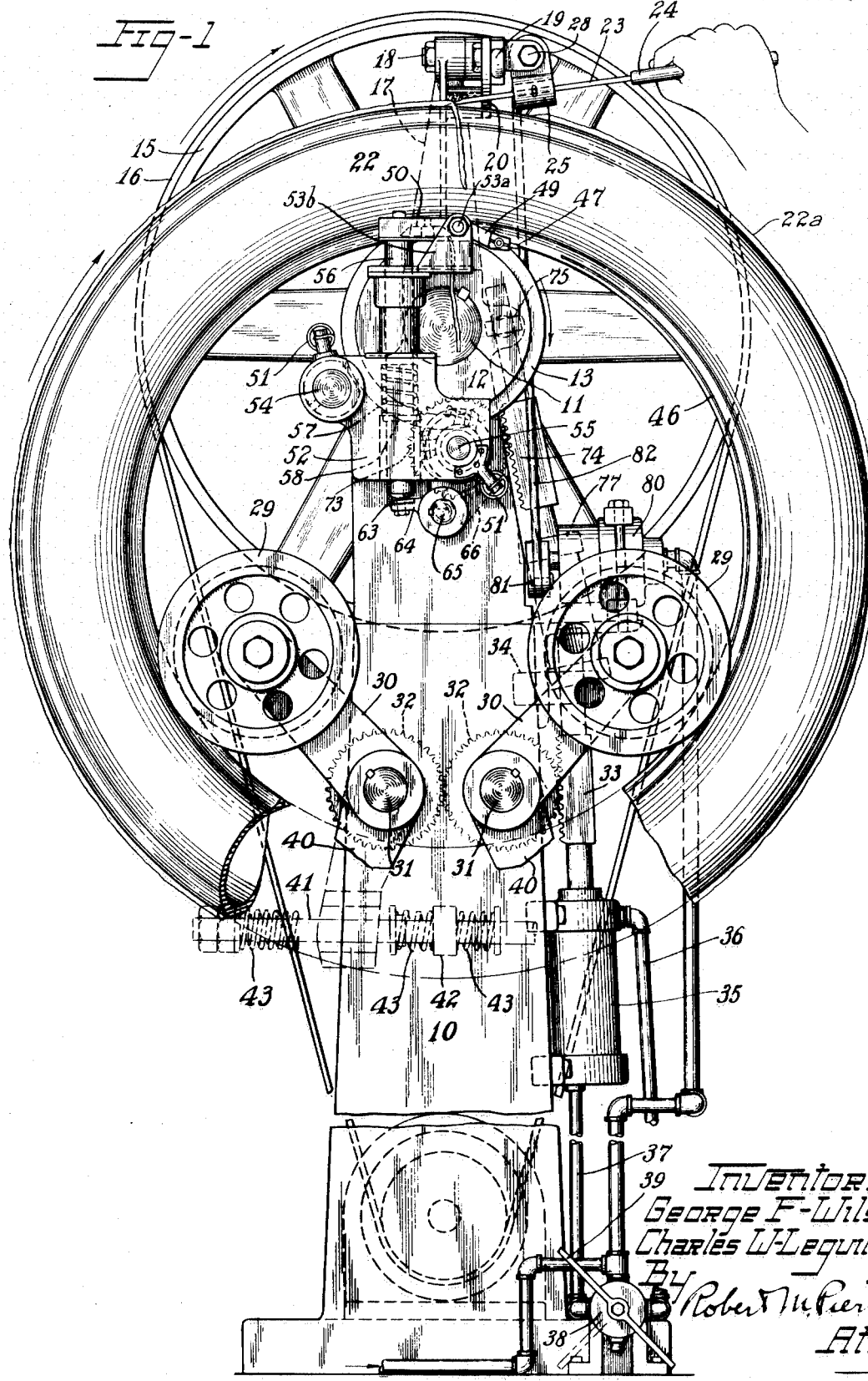
Fig. 1 is an end elevation of a machine embodying our invention in its preferred form, as adapted for straight-side tires, and the work therein, parts being broken away.

Referring to the drawings, the machine comprises a frame 10 in which is journaled a shaft 11 having a projecting end portion upon which is secured a tire-supporting and driving roller 12 formed with a medial, outwardly-tapered, circumferential rib 13 and with a knurled, cylindrical zone 14 on each side of said rib. The opposite end of the said shaft 11 is provided with a pulley 15 and a belt 16 thereon, for continuously driving the roller 12.

Rising from the frame 10 is a standard 17, upon the upper end of which is pivoted at 18 a knife-carrying hand-lever 19 provided with an arcuate brake-shoe 20 adapted to coact with a spring-plunger friction brake 21 mounted on the standard 17 to hold the lever 19 either in a raised, inoperative position, or in an approximately horizontal, operative position, with its outer end portion over a tire, 22, mounted upon the roller 12.

For trimming the tread fin or rand 22ª from the tire as the latter is rotated by its supporting roller 12, a V-knife 23 having a handle 24 is clamped at an intermediate part thereof in a block 25 and is adapted to be held in approximately tangent relation to the tire and in trimming relation to the rand, the block 25 being hinged to a block 26 on an axis 27 such as to permit the knife to be turned in a plane approximately tangent to the tire, and the block 26 being hinged to the lever 19 on an approximately horizontal axis 28 so that the knife may be tilted vertically to give it the proper, approximately tangent relation to the work which is best suited for the smooth trimming of the rand. The blocks 25 and 26 are preferably of short length, so that a large part of the force of the work against the knife 23 is sustained by the lever 19 and only a small part of the said force is transmitted through the knife to the hand of the operator, by which the handle 24 is grasped to position and steady the knife.

For steadying the tire as it is rotated, and for holding it firmly against the driving roller 12, a pair of grooved rollers 29, 29, each adapted to straddle the inner periphery of the tire, are loosely journaled upon stub shafts projecting from the ends of respective arms 30, 30 which are secured upon the ends of respective shafts 31, 31 journaled in the frame 10, and provided at their opposite ends with intermeshed gears 32, 32, to compel them to rotate equally in opposite directions in the spreading apart of the grooved rollers 29 to engage the tire and in the swinging of the said rollers toward each other to release the tire.

For so actuating the said rollers, a vertical rack 33, meshed with one of the gears 32, has a cylindrically extended upper end portion slidably mounted in an apertured guide bracket 34 projecting from the machine frame, and a cylindrically extended lower end portion constituting a piston rod for a piston in a cylinder 35 secured to the frame of the machine. Said piston is adapted to be charged and exhausted through pipes 36, 37, leading to its respective ends from a suitable control valve 38 provided with a foot lever 39.

To limit and cushion the movement of the roller arms 30 said arms are provided with extensions 40, 40 beyond their shafts 31, said extensions being formed at their lower ends with respective apertures in which is loosely mounted a stop-bar 41 provided at its middle with a flange 42 and at its ends with nuts, compression springs 43, 43 being mounted on the bar at each side of the flange 42 and adjacent the nuts and adapted to be compressed against the flange or the nuts by the extensions 40, in cushioning and stopping the movement of the roller-supporting arms 30.

For trimming the bead fins or rands, shown at 46, 46, respective V-knives 47, 47 are mounted in the eyes of respective eye-bolts 48, 48, by which they are clamped against oblique end faces of respective supporting arms 49, 49 adapted to hold the knives in trimming relation to the beads of the tire. A roller 50 is journaled in the walls of a slot formed in each of said arms, just in advance of the knife, and is adapted to run upon the side face of the tire bead to limit the pressure of the knife against the tire under the force of pull springs 51, 51 which connect slide blocks 52, 52, upon which respectively the two trimming devices are mounted, each of the arms 49 being backed by a roller 53 mounted upon the slide-block and adapted to prevent the arm from swinging away from the work while permitting it to move vertically. Each of the rollers 53 is journaled between forks formed on the end of a bolt 53ª adjustably mounted in a bracket 53ᵇ rising from the slide-block, so that the angle of the arm with relation to the work may be varied to obtain the desired contact of both the knife 47 and the roller 50 with the work. The slide-blocks 52 are mounted upon a fixed shaft 54 and a rotatable shaft 55 mounted in the machine frame.

The immediate support of each arm 49 is a vertical slide bar 56 mounted in the block 52 and adapted to raise the arm bodily as its slide-block is moved away from the work and to lower it bodily as the slide-block is moved toward the work, the arm's resulting path of movement being such that the knife 47 will be stopped against the work at a higher or lower position according to the thickness of the tire bead and the corresponding position of the mold fin on the outer side face thereof. The guide aperture in the block 52 in which the vertical slide bar 56 is mounted is of enlarged section or counterbored in its lower portion to accommodate a helical compression spring 57 set in the counterbore, surrounding the slide bar 56, and bearing against a flange 58 formed on an intermediate part of the slide bar to urge the latter downward, against a device hereinafter described for raising the bar against the force of said spring.

For spreading the slide-blocks 52 apart to retract the bead trimmers from the work, against the force of the pull springs 51, each of said slide-blocks is formed on its inner side with a cam 59 having its working face curved helically about the rotatable shaft 55, the two cams being adapted to be forced apart by respective cam rollers 60, 60, journaled, on axes radial with respect to the shaft, in recesses formed in the ends of a longitudinally disposed lug or arm 61 projecting from a sleeve 62 keyed upon the shaft. The faces of the cams 59 and the cam rollers 60 are preferably beveled, as shown, to avoid friction.

For raising the vertical slide bars 56 as the shaft 55 is turned in thus spreading apart the blocks 52, the lower end of each slide bar 56 slidably rests upon a plate 63 (Figs. 1 and 4) secured upon the end of an arm 64 projecting from a rock-shaft 65 provided with a dual rocker-arm 66 of which one member, rotatably mounted upon the shaft, has a cam-roller 67 journaled on its outer end and the other member, fixed on the shaft, has a set screw 68 bearing against the first member for adjustment of the two members angularly with relation to each other to vary the elevation of the oblique path of movement of the bead trimmers. For determining the oblique paths of the knives 47 the cam roller 67 is adapted to coact with a cam 69 (Fig. 4) rotatably mounted upon the shaft 55 and adapted to be angularly adjusted thereon by means of opposed set screws 70, 70 mounted in respective lugs 71ª, 71ª projecting from the face of a collar 71 secured upon the shaft 55, said set screws bearing upon respective shoulders 72, 72, formed on the periphery of the cam. The cam 69, by being thus set in different adjusted positions, is adapted to give to the knives different curved paths, to accord with different series of tires having their mold fins in tires of different sizes varying in position in accordance with one or another set of gradations.

For driving the shaft 55, counter-clockwise as viewed in Figs. 1 and 4, through part of a revolution, to spread apart the slide-blocks 52 and thus withdraw the bead trimmers from the work, and concurrently, through the cam 69 and rock shaft 65, to raise the vertical slide bars 56 and the trimming knives carried thereby, a pinion 73 is secured upon the shaft 55 and is meshed with a rack 74, which has its upper end portion cylindrically extended and guided in an apertured bracket 75 projecting from the machine frame and its lower end portion cylindrically extended and constituting a piston rod for a piston 76 in a one-way cylinder 77 secured to the machine frame. For charging and exhausting the lower end of the cylinder a supply pipe 78 leads thereto through a suitable control valve 80 having its control lever 81 connected by a link 82 with the hand lever 19.

In the operation of the machine, the shaft 11 being driven, the hand lever 19 being raised and the lower end of the cylinder 77 consequently charged, to hold the bead trimmers in their spread apart and elevated, inoperative positions, and the lower end of the cylinder 35 being charged, to hold the grooved, tire-guiding rollers 29 in inoperative positions, close together, the tire 22 is simply hung upon the supporting and driving roller 12, the tapered flange 13 thereof spreading and holding apart the beads of the tire.

As the tire is thus mounted and begins to rotate with the roller 12 the upper end of the cylinder 35 is charged and its lower end exhausted, by throwing the foot lever 39, to spread apart the grooved rollers 29 into guiding contact with the tire, so that the tire is driven smoothly and without oscillation.

The operator then pulls down the hand lever 19 with one hand and positions the tread trimming knife 23 with the other so as to trim the tread fin from the tire, and the concurrent exhausting of the lower end of the cylinder 77, through the action of the link 82, permits the springs 51 to draw the slide-blocks 52 toward each other as the cam rollers 60 are permitted to yield, rotating the shaft 55, under the force of the cams 59, until the slide-blocks 52 are stopped by contact of the bead trimmers with the work, whereupon further rotation of the shaft 55 is prevented by friction of the several parts, including that of the piston 76 in the cylinder 77. During this rotation of the shaft 55 the cam 69 thereon, rotating clockwise as viewed in Figs. 1 and 4, permits the springs 57 and the weight of the vertical slide bars 56 and parts carried thereby to lower the bead trimmers gradually as they move toward the work, the trimmers thus moving inward and downward along determinate paths such that they will be stopped against a relatively high part of the bead of a large tire, having a thick bead interposed between the trimmer and the flange 13 of the roller 12, or against a relatively low part of the bead of a smaller tire, having a relatively thin bead so interposed. As the larger tires customarily have their mold fins at a relatively high part of the bead, this results in the bead trimming knives 47 being brought into proper trimming relation to the fins on different sized tires without special adjustment of the machine.

As the tire continues to be rotated after the three trimming knives are brought into position as described, the three fins are neatly trimmed from the tire, after which the hand lever 19 is raised to withdraw concurrently the three trimming devices, the cylinder 35 is reversed to swing the grooved rollers 29 inward away from the tire to release the latter, which is then removed from the machine, and the latter is then ready for the reception of the next tire and a repetition of the operation as described.

Modifications may be resorted to without departing from the scope of our invention, and we do not wholly limit our claims to the specific construction described.

We claim:

1. A tire-trimming machine comprising means for rotatably supporting the tire, a V-knife, and knife-holding means mounted for determinate movement such as to present said knife in trimming relation to mold fins of successive tires mounted on said supporting means without visual positioning of the knife by the operator against the respective tires.

2. A tire-trimming machine comprising means for rotatably supporting the tire, a V-knife, and knife-holding means mounted for determinate movement such as to present said knife in trimming relation to mold fins of successive tires mounted on said supporting means and having their mold fins at different positions without visual positioning of the knife by the operator against the respective tires.

3. A tire-trimming machine comprising three tire-supporting and guiding rollers adapted to engage the inner periphery of the tire at respective positions in an arc of not less than 180°, means for driving one of said rollers to drive the tire, and a trimming device in the orbit of the tire adapted to trim the same as it is so driven.

4. A tire-trimming machine comprising three tire-supporting and guiding rollers adapted to engage the inner periphery of the tire at respective positions in an arc of not less than 180°, means for driving one of said rollers to drive the tire, and a trimming device comprising a V-knife in the orbit of the tire adapted to trim the same as it is so driven.

5. A tire-trimming machine comprising a roller formed with approximately cylindrical zones adapted to engage the beads of the tire and with a circumferential flange between said zones adapted to extend between the beads, and means adapted to trim overflow rubber from a tire mounted on said roller, at the position of the roller, as the tire is rotated thereon.

6. A tire-trimming machine comprising a roller formed with approximately cylindrical zones adapted to engage the beads of the tire and with a circumferential flange between said zones adapted to extend between the beads, a V-knife, and means for holding said knife in position to trim overflow rubber from a tire mounted on said roller, at the position of said roller, as the tire is rotated thereon.

7. A tire-trimming machine as defined in claim 6 comprising means for determinately moving the knife into and out of trimming relation to the tire without visual positioning of the knife against the tire by the operator.

8. A tire-trimming machine comprising a roller formed with approximately cylindrical zones adapted to engage the beads of the tire and with a circumferential flange between said zones adapted to extend between the beads, a V-knife, and knife-holding means mounted for determinate movement such as to present said knife in trimming relation to mold fins of successive tires mounted on said roller and having their mold fins at different positions in accordance with the size of the tire, without visual positioning of the knife by the operator with relation to the respective mold fins.

9. A tire-trimming machine comprising means for rotatably supporting a tire, a trimming device adapted to trim a mold fin from the tread portion of a tire mounted thereon, a trimming device adapted to trim a mold fin from a bead portion of the tire, and interconnected means for concurrently moving said trimming devices into their trimming positions.

10. A tire-trimming machine as defined in claim 9 in which the means for moving one of the trimming devices into trimming position is adapted to carry the same in a determinate path such as not to require visual positioning of said device by the operator with relation to the mold fins of successive tires.

11. A tire-trimming machine comprising means for so supporting and driving successive tires of different sizes as to cause the toe of the tire bead to pass a determinate point, a V-knife, and knife-holding means mounted for determinate movement such as to carry said knife into trimming relation to the tire by an oblique movement such that the knife will contact the tire at a position radially of the tire determined by the thickness of the bead of the tire.

12. A tire-trimming machine comprising means for supporting and rotating a tire, a V-knife, and means for presenting said knife in trimming relation to a mold fin on the outer side face of the tire by determinate movement of the knife into contact with the tire.

13. A tire-trimming machine comprising means for rotatably supporting a tire, a knife supporting member mounted for sliding movement toward and from the tire, at one side thereof, a knife-supporting arm pivoted on said member for movement about an axis approximately radial with relation to the axis of revolution of the tire, a V-knife and a roller mounted on said arm and adapted to bear against the side face of the tire, and means for holding said arm in different angular positions about its pivotal axis, so as to control the relative pressures of the tire against the V-knife and the roller.

14. A tire-trimming machine comprising means for rotatably supporting a tire, a knife-supporting block mounted at the side of the tire for sliding movement from and toward the tire, a knife-holding member mounted for relative sliding movement on said block in a direction approximately radial with relation to the axis of rotation of the tire, a V-knife carried by said knife-holding member, and means for so actuating said knife-supporting block and said knife-holding member as to present the said knife in trimming relation to the tire and retract it therefrom.

15. A tire-trimming machine comprising means for rotatably supporting a tire, a knife-supporting block mounted at the side of the tire for sliding movement from and toward the tire, a knife-holding member mounted for relative sliding movement on said block in a direction approximately radial with relation to the axis of rotation of the tire, a V-knife carried by said knife-holding member, and means for so actuating said knife-supporting block and said knife-holding member as to present the said knife in trimming relation to the tire and retract it therefrom, the last said means being adapted so to actuate the knife-supporting block and the knife-holding member concurrently as to carry the knife, through an oblique path in a plane radial of the tire's axis of rotation, into contact with the tire.

16. A tire-trimming machine comprising means for rotatably supporting a tire, a knife-supporting member mounted at a side of the tire for sliding movement from and toward the same, a slide-bar rotatably mounted in said member and disposed approximately radially with relation to the axis of rotation of the tire, a knife-holding arm secured to said slide bar and projecting substantially at right angles therefrom, a V-knife mounted on said arm, a roller mounted on said knife-supporting member and adapted to back said arm against the pressure of the work upon said knife and to run on said arm in the sliding movement of said slide-bar, and means for concurrently so actuating said knife-supporting member and said slide bar as to carry said knife, through an oblique path in a plane radial of the tire's axis of rotation, into contact with the tire.

17. A tire-trimming machine comprising a projecting tire-supporting roller formed with a circumferential flange adapted to enter between the beads of a tire hung thereon and with tire-supporting zones at the respective sides of said flange, means for driving said roller, a pair of guide rollers mounted for movement from and toward each other to engage and release the tire, said rollers being adapted to engage the inner periphery of the tire at the ends of an upper arc of the tire of more than 180°, and means for trimming overflow rubber from a side face of the tire as it is rotated on said rollers.

18. A tire-trimming machine comprising means for rotatably supporting a tire, a trimming device mounted at the side of the tire for determinate movement toward and from the tire, means for so moving the trimming device, and means for holding the trimming device in such different positions radially of the tire with relation to its moving means as to give the trimming device different paths of movement toward and from the tire.

19. A tire-trimming machine comprising means for rotatably supporting a tire, a V-knife mounted at the side of the tire for determinate movement toward and from the tire in an oblique path in a radial, axial plane, means for so moving said knife, and means for holding said knife in such different positions radially of the tire as to give the knife different oblique paths of movement in said radial, axial plane.

In witness whereof we have hereunto set our hands this 11th day of February, 1925.

GEORGE F. WILSON.
CHARLES W. LEGUILLON.